United States Patent
Sharma et al.

(10) Patent No.: US 11,899,800 B2
(45) Date of Patent: *Feb. 13, 2024

(54) OPEN SOURCE VULNERABILITY PREDICTION WITH MACHINE LEARNING ENSEMBLE

(71) Applicant: Veracode, Inc., Burlington, MA (US)

(72) Inventors: Asankhaya Sharma, Singapore (SG); Yaqin Zhou, Singapore (SG)

(73) Assignee: Veracode, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,425

(22) Filed: Jun. 28, 2022

(65) Prior Publication Data
US 2022/0327220 A1 Oct. 13, 2022

Related U.S. Application Data

(63) Continuation of application No. 16/105,016, filed on Aug. 20, 2018, now Pat. No. 11,416,622.

(51) Int. Cl.
*G06F 21/57* (2013.01)
*G06N 20/00* (2019.01)
*G06N 7/01* (2023.01)

(52) U.S. Cl.
CPC ............ *G06F 21/577* (2013.01); *G06N 7/01* (2023.01); *G06N 20/00* (2019.01); *G06F 2221/034* (2013.01)

(58) Field of Classification Search
CPC .... G06F 21/577; G06F 21/563; G06F 21/552; G06F 2221/033; G06F 2221/034;
(Continued)

(56) References Cited

U.S. PATENT DOCUMENTS 8,484,225 B1 * 7/2013 Datta .................. G06N 5/02
707/752
9,679,261 B1 * 6/2017 Hoover .................. G06N 20/00
(Continued)

FOREIGN PATENT DOCUMENTS

EP          2182458 A1    5/2010
WO    2017181286 A1    10/2017

OTHER PUBLICATIONS

Ruchika Malhotra et al., Analysis of evolutionary algorithms to improve software defect prediction, IEEE (Year: 2017).*
(Continued)

*Primary Examiner* — Shanto Abedin
(74) *Attorney, Agent, or Firm* — Gilliam IP PLLC

(57) ABSTRACT

A system to create a stacked classifier model combination or classifier ensemble has been designed for identification of undisclosed flaws in software components on a large-scale. This classifier ensemble is capable of at least a 54.55% improvement in precision. The system uses a K-folding cross validation algorithm to partition a sample dataset and then train and test a set of N classifiers with the dataset folds. At each test iteration, trained models of the set of classifiers generate probabilities that a sample has a flaw, resulting in a set of N probabilities or predictions for each sample in the test data. With a sample size of S, the system passes the S sets of N predictions to a logistic regressor along with "ground truth" for the sample dataset to train a logistic regression model. The trained classifiers and the logistic regression model are stored as the classifier ensemble.

20 Claims, 7 Drawing Sheets

(58) Field of Classification Search
CPC ......... G06F 21/00; G06F 21/10; G06N 20/20; G06N 7/005; G06N 3/0472
See application file for complete search history.

(56) References Cited

U.S. PATENT DOCUMENTS

| | | | |
|---|---|---|---|
| 9,785,983 | B2 | 10/2017 | Zhao et al. |
| 10,685,284 | B2* | 6/2020 | Smyth ................. G06N 3/04 |
| 10,764,246 | B2 | 9/2020 | Huang et al. |
| 10,817,604 | B1* | 10/2020 | Kimball ............ G06F 21/563 |
| 11,170,104 | B1* | 11/2021 | Stickle ................ G06N 20/00 |
| 2006/0037080 | A1* | 2/2006 | Maloof ............... G06F 21/562 726/24 |
| 2007/0282766 | A1 | 12/2007 | Hartman et al. |
| 2008/0104101 | A1 | 5/2008 | Kirshenbaum et al. |
| 2011/0112882 | A1 | 5/2011 | Summers |
| 2011/0301863 | A1* | 12/2011 | Auribault ............. G16B 20/20 702/20 |
| 2013/0097706 | A1 | 4/2013 | Titonis et al. |
| 2016/0155069 | A1* | 6/2016 | Hoover ................. G06Q 30/06 706/12 |
| 2016/0182553 | A1 | 6/2016 | Tripp et al. |
| 2016/0253466 | A1 | 9/2016 | Agaian et al. |
| 2016/0253597 | A1 | 9/2016 | Bhatt et al. |
| 2017/0109657 | A1 | 4/2017 | Marcu et al. |
| 2017/0308960 | A1 | 10/2017 | Mascaro et al. |
| 2018/0013772 | A1* | 1/2018 | Schmidtler .......... H04L 63/145 |
| 2018/0034842 | A1 | 2/2018 | Smyth et al. |
| 2018/0089582 | A1 | 3/2018 | Bouillet et al. |
| 2018/0224285 | A1 | 8/2018 | Stajner et al. |
| 2018/0285740 | A1 | 10/2018 | Smyth et al. |
| 2018/0293511 | A1 | 10/2018 | Bouillet et al. |
| 2018/0300482 | A1 | 10/2018 | Ll et al. |
| 2018/0308003 | A1* | 10/2018 | Singh .................. G06N 20/00 |
| 2019/0138731 | A1* | 5/2019 | Tan ....................... G06N 7/01 |
| 2019/0205542 | A1 | 7/2019 | Kao et al. |
| 2019/0228319 | A1* | 7/2019 | Gupta ..................... G06F 8/71 |
| 2019/0268366 | A1 | 8/2019 | Zeng et al. |
| 2019/0273754 | A1 | 9/2019 | Ting |
| 2019/0347424 | A1 | 11/2019 | Bezzi et al. |
| 2019/0377880 | A1 | 12/2019 | Kolychev et al. |
| 2020/0057857 | A1 | 2/2020 | Roytman et al. |

OTHER PUBLICATIONS

PCT Application No. PCT/US2019/047146, International Preliminary Report on Patentability, dated Nov. 26, 2020, 34 pages.

PCT Application Serial No. PCT/US2019/047146, International Search Report, dated Oct. 31, 2019, 4 pages.

PCT Application Serial No. PCT/US2019/047146, International Written Opinion, dated Oct. 31, 2019, 8 pages.

PCT Application Serial No. PCT/US2019/047146, Written Opinion of the International Preliminary Examining Authority, dated Jul. 23, 2020, 10 pages.

"Early Identification of Vulnerable Software Components via Ensemble Learning", Yu lei Pang et al, IEEE Xplore (Year: 2016), 6 pages.

"K-fold Cross validation of ensemble learning,", source: http://stats.stackexchange.com. (Year: 2014), 5 pages.

Bozorgi, et al., "Beyond Heuristics: Learning to Classify Vulnerabilities and Predict Exploits".

Galar, et al., "A Review on Ensembles for the Class Imbalance Problem: Bagging-, Boosting-, and Hybrid-Based Approaches", IEEE Transactions on Systems, Man, and Cybernetics, Part C (Applications and Reviews) 42, 4, 22 pages.

Laradji, et al., "Software defect prediction using ensemble learning on selected features", Information and Technology vol. 58; Elsevier B. V. (Year: 2014), 15 pages.

Mikolov, et al., "Distributed Representations of Words and Phrases and their Compositionality", NIPS'13 Proceedings of the 26th International Conference on Neural Information Processing Systems, vol. 2, 9 pages, Lake Tahoe, Nevada, USA, 2013.

Perl, et al., "VCCFinder: Finding Potential Vulnerabilities in Open-Source Projects to Assist Code Audits", CCS '15 Proceedings of the 22nd ACM SIGSAC Conference on Computer and Communications Security, 12 pages, Denver, Colorado, USA, 2016.

Sabottke, et al., "Vulnerability Disclosure in the Age of Social Media: Exploiting Twitter for Predicting Real-World Exploits", SEC'15 Proceedings of the 24th USENIX Conference on Security Symposium, 16 pages, Washington, D.C., USA, 2015.

Scandariato, et al., "Predicting Vulnerable Software Components via Text Mining".

\* cited by examiner

OPEN SOURCE VULNERABILITY PREDICTION WITH MACHINE LEARNING ENSEMBLE

BACKGROUND

The disclosure generally relates to the field of information security, and more particularly to software development, installation, and management.

Modern software development relies upon open source libraries to allow the rapid prototyping and development of new code. As open source libraries are created and revised, bug fixes and vulnerabilities are not always publicly published. Relevant forums and developer notes often contain pertinent information regarding the stability of open source libraries, but it is difficult to use this information due to the large volume of data.

BRIEF DESCRIPTION OF THE DRAWINGS

Embodiments of the disclosure may be better understood by referencing the accompanying drawings.

DESCRIPTION

Figure 1:
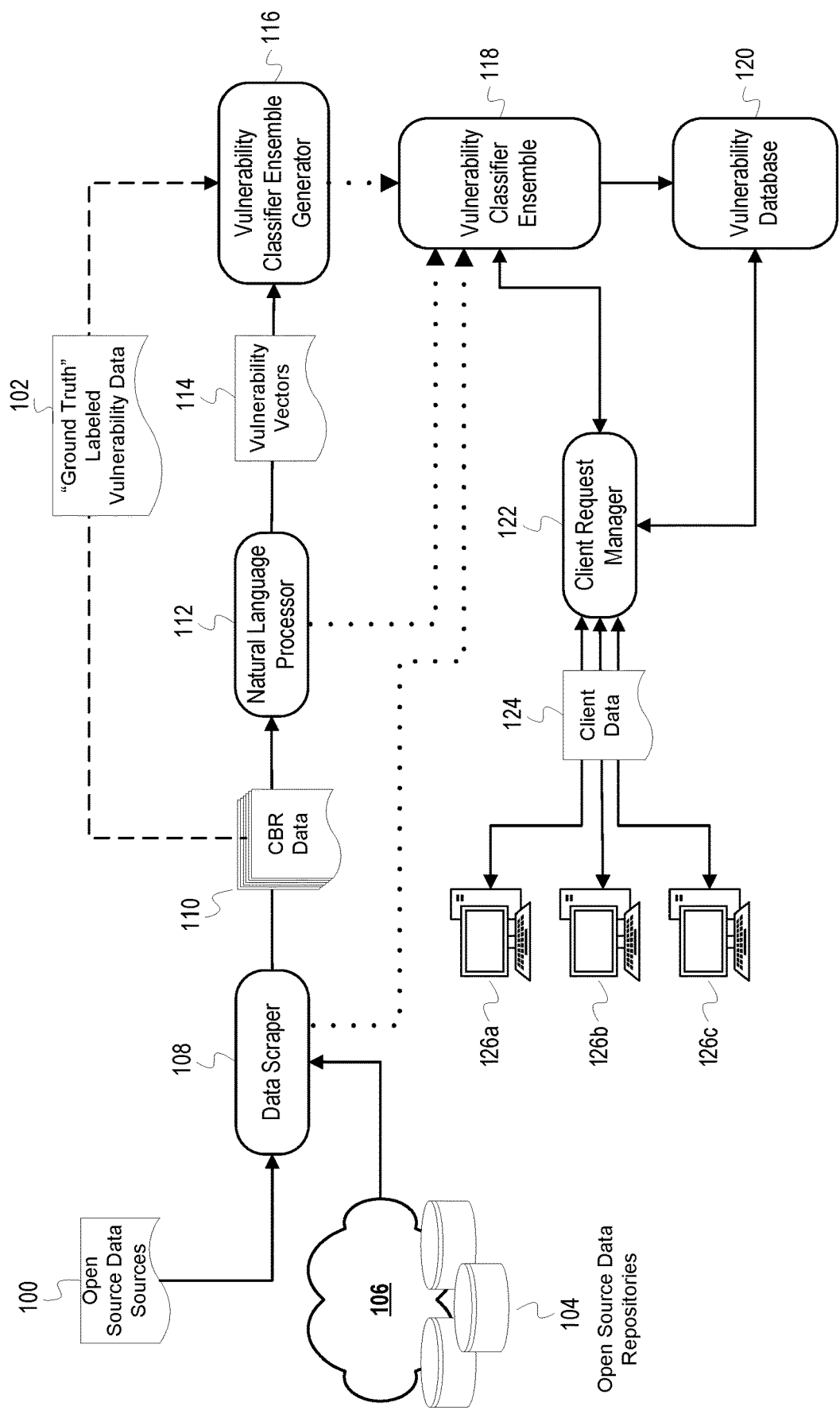
FIG. 1 depicts the training and deployment of an automatic vulnerability identification system for open source libraries.

The description that follows includes example systems, methods, techniques, and program flows that embody embodiments of the disclosure. However, it is understood that this disclosure may be practiced without these specific details. For instance, this disclosure refers to K-nearest neighbors in illustrative examples. Aspects of this disclosure can be also applied to other machine learning algorithms. In other instances, well-known instruction instances, protocols, structures and techniques have not been shown in detail in order not to obfuscate the description.

Introduction

To aid in software development, software developers typically adopt issue-tracking and source control management systems. These tools are popular for open source projects and modern software development. Developers work on reported issues in these systems, then commit corresponding code changes to a source control management system. Bug fixes and new features are frequently merged into a central repository, which is then automatically built, tested, and prepared for a release to production, as part of the DevOps practices of continuous integration and continuous delivery ("CI/CD"). However, numerous security-related issues and vulnerabilities are identified and patched without public disclosure due to the focus on fast release cycles and the lack of manpower and expertise. An estimated 53% of vulnerabilities in open source libraries are not disclosed publicly. In addition, fixes to these undisclosed vulnerabilities are sometimes not reported ("silent fixes").

Overview

A system to create a stacked classifier model combination or classifier ensemble has been designed for identification of undisclosed flaws (e.g., bugs and vulnerabilities) in software components (e.g., open source libraries) on a large-scale. This classifier ensemble is capable of at least a 54.55% improvement in precision. The system uses a K-folding cross validation algorithm to partition or split a sample dataset and then trains and tests a set of N classifiers with the split dataset. At each test iteration, trained models of the set of classifiers generate probabilities/predictions that a sample has a flaw, resulting in a set of N probabilities or predictions for each sample in the test data. With a sample size of S, the system passes the S sets of N predictions to a logistic regressor along with "ground truth" (represented with labels) for the sample dataset to train a logistic regression model. The trained classifiers and the logistic regression model are stored as the classifier ensemble. The classifier ensemble can then be used to generate a probability that a software component or project has a flaw. Output from the classifier ensemble can be inserted into a database of identified flaws, which can then be used to guide developers in open source library selection in rapid software development. For instance, an agent can be programmed to monitor or analyze a software project and access the database to identify vulnerabilities in the software project.

Example Illustrations

FIG. 1 depicts the training and deployment of an automatic vulnerability identification system for open source libraries. A list of open source data sources 100 is shared with a data scraper 108. The data scraper 108 scrapes data sources from a number of open source data repositories 104 via a network 106 to accumulate commit messages and bug reports (hereafter "CBR data") 110. A natural language processor (hereafter "NLP") 112 processes the CBR data 110. The NLP 112 generates vulnerability vectors 114 based on the CBR data 110 and provides them to a vulnerability classifier ensemble generator ("generator") 116. The generator 116 uses the vulnerability vectors 114 and "ground truth" labeled vulnerability data 102 to generate a vulnerability classifier ensemble 118. The vulnerability classifier ensemble 118 is deployed to identify vulnerabilities in software components which may be in a software project, open source project, and/or open source library. The ensemble 118 generates a probability value that a software component has a flaw and this probability value in association with identification of the software component is inserted into a vulnerability database 120.

Referring back to the data scraper 108 prior to generation of the classifier ensemble 118, the data scraper 108 collects the CBR data 110 from the open source data repositories 104 over the network 106 based on the list of open source libraries 100. The data scraper 108 collects CBR data 110 by collecting "software artifacts" based on relevant text. A software artifact may be a commit message, comment in a forum, bug report, issue, text extracted from any one of these, etc. The scraper 108 determines relevant text based on known organizational structures for data in the open source data repositories 104. For example, a forum may be known to label topics by open source library name and organize comments with a particular spacing. The data scraper 108 can extract the text from each comment of each relevant topic. In general, the data scraper 108 is programmed to gather data from interfaces oriented toward human accessibility. The data scraper 108 can also be configured to gather data from data repositories with various formats.

Example data sources of the CBR data 110 include forums, open source library repositories, and blog posts, which are elements of the open source data repositories 104. The CBR data 110 may contain a combination of natural language and code-specific language. The NLP 112 is designed to process this language combination of the CBR data 110. The code-specific language may include universal resource locators ("URLs"), types of software vulnerabilities, abbreviations (e.g., XSS), acronyms, and other software development or programming specific terminology. Commit messages and bug reports, titles, descriptions, comments, numbers of comments, attachment numbers, labels, dates of creation, and last edited dates may be extracted by the data scraper 108 as the CBR data 110, as this information is generally available in most bug reports and is relevant to vulnerability detection. Among the selected features, titles, descriptions, comments, and labels are text features that contain semantic information which can be processed by the NLP 112. The numbers of comments and attachments are numeric features which may reflect the attention and resolution a bug report received. Similarly, the difference between the created and last edited date reflects the resolution time, allowing vulnerabilities to be correlated with corresponding versions of open source libraries.

The NLP 112 takes the CBR data 110 as input and performs language processing operations to generate the vulnerability vectors 114. The vulnerability vectors 114 comprise frequency counts of tokens (words or phrases) from the CBR data 110 which indicate the presence of a vulnerability. The NLP 112 generates the vulnerability vectors 114 by recording words or phrases in the CBR data 110 indicative of vulnerabilities. The NLP 112 may have been manually trained by embedding words known to be indicative of vulnerabilities into a vector space to generate relationships between different words. Words or phrases in the CBR data 110 are then evaluated based on their proximity or association with the words embedded in the vector space. The functionality of the NLP 112 is explored in greater detail by the FIG. 4 description below.

The NLP 112 provides the vulnerability vectors 114 as input to the generator 116. The generator 116 uses the vulnerability vectors 114 and the vulnerability data 102 to generate a classifier ensemble based on training a number N of classifiers with a K-splitting algorithm and using logistic regression. Using N classifiers improves performance for imbalanced datasets.

The generator 116 trains and tests the N classifiers to accurately identify vulnerabilities by classifying the vulnerability vectors 114 and validating identifications with the vulnerability data 102. This training and testing generates for each vulnerability vector a prediction from each trained classifier. Assuming S of the vulnerability vectors 114 were in the testing data, the generator 116 generates S sets of N predictions. The generator 116 then uses the predictions made by the N trained classifiers with the vulnerability data 102 to train a logistic regression model. The generator 116 forms the ensemble 118 by combining the trained N classifiers with the trained logistic regression model. To combine, the generator 116 can create program code that linearly combines output probabilities for a software component from the trained N classifiers to the logistic regression model and program code to fit the linearly combined probabilities to the probability distribution of the logistic regression model.

The ensemble 118 can be used in coordination with the NLP 112, as well as the data scraper 108 The NLP 112 can be used to generate vectors from information about a code unit or a software project. The data scraper 108 can operate in conjunction with the NLP 112 and the ensemble 118 to periodically or on demand scrape one or more target repositories. The vulnerability database 120 is updated with results from the ensemble 118. The vulnerability database 120 can be accessed prior to employing the ensemble 118 to avoid repeated processing of the same open source components. Embodiments may further enhance the quality of the database 120 with expert evaluation of the components identified as having or being vulnerabilities by the ensemble 118. The open source components (e.g., libraries or projects) can be stored in association with the vulnerability prediction or probability value. When presented for evaluation, the database 120 can present the components identified as vulnerabilities with their associated confidence values for sorting or filtering to allow the experts to evaluate more efficiently.

The client systems 126a-c submit requests for vulnerability identification by sharing the client data 124 with the client request manager 122. The client manager 122 acts as an interface between the client systems 126a-c and both the ensemble 118 and the vulnerability database 120. The client request manager 122 receives the client data 124 from the client systems 126a-c. The received client data 124 may comprise operational parameters and a list of open source libraries with specified versions. The operational parameters may include a Boolean denoting whether a client system has requested a new search of the open source libraries or a probability threshold for vulnerability identification. The client request manager 122 may provide received client data 124 to the AVIS 118 and the vulnerability database 120 for vulnerability identification as appropriate.

The client request manager 122 accesses the vulnerability database 120 to determine whether appropriate vulnerability information is available for the open source libraries in the client data 124. In some cases, the vulnerability database 120 may return query results that indicate appropriate information is available for some open source libraries in the client data 124 but not others. In such cases, the ensemble 118 can process the client data 124 based on those open source libraries for which the vulnerability database 120 does not have information. The new data is stored or merged with existing data in the vulnerability database 120. The vulnerability database 120 then returns appropriate information for each of the open source libraries in the client data 124 to the client request manager 122.

For example, the client system 126a may request vulnerability data for an open source library titled "openLibraryV1.1". The client system 126a sends the request to the client request manager 122, which accesses the vulnerability database 120 accordingly. The vulnerability database 120 returns results that indicate whether or not any known vulnerabilities for "openLibraryV1.1" are stored therein. The vulnerability database 120 may report that the open source library "openLibraryV1.1" has vulnerabilities. If the vulnerability database 120 does not contain vulnerability data for "openLibraryV1.1", this result can trigger the client request manager 122 to invoke the ensemble 118 to automatically identify vulnerabilities for "openLibraryV1.1". The identified vulnerabilities are then stored in the vulnerability database 120 and communicated to the client request manager 122, which returns the relevant vulnerability data to the client system 126a. In some cases, the client system 126a may directly request a new search be performed for "openLibraryV1.1" to ensure that vulnerabilities are detected. This request may be made based on operational parameters specified by the client system 126a in the client data 124.

Figure 2:
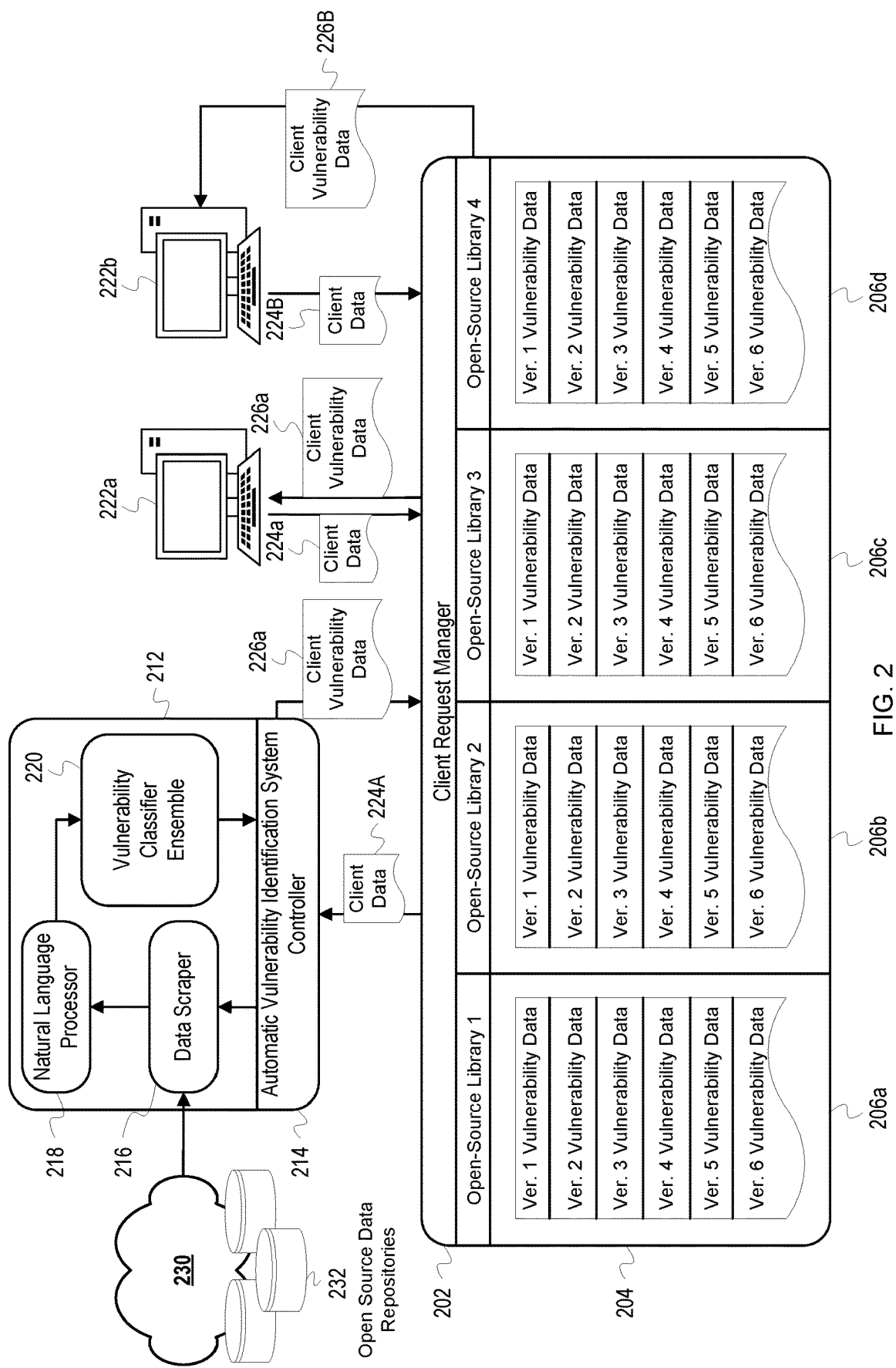
FIG. 2 depicts example client systems interacting with a vulnerability database and an automatic vulnerability identification system through a client request manager.

FIG. 2 depicts example client systems interacting with a vulnerability database and an automatic vulnerability identification system through a client request manager. A client request manager 202 transmits client data 224a and 224b between client systems 222a and 222b, a vulnerability database 204, and an automatic vulnerability identification system (AVIS) 212. The vulnerability database 204 comprises open source library data 206a-d. The AVIS 212 comprises an AVIS controller 214, a data scraper 216 with access to open source data repositories 232 over a network 230, an NLP 218, and a vulnerability classifier ensemble 220. The AVIS 212 generates client vulnerability data 226a from the client data 224a.

For the example system, the client request manager 202 and the vulnerability database 204 are shown to exist on the same device. This allows the client request manager 202 direct access to the open source library data 206a-d. In some cases, the client request manager 202 and the vulnerability database 204 exist on different devices and may interact over a wired or wireless connection. In some cases, the client request manager 202, the vulnerability database 204, and the AVIS 212 may exist on the same device.

The vulnerability database 204 contains the open source library data 206a-d for four different open source libraries. The open source library data 206a comprises a table of version histories for the open source library with associated vulnerability data. The vulnerability data may comprise a number of vulnerabilities for each version of the open source library and probabilities associated with each identified vulnerability. In some cases, each of the number of vulnerabilities may be identified and alternative open source libraries may be added to the vulnerability data manually or automatically from predetermined vulnerability data repositories. Similar information is contained in the open source library data 206b-d.

The client request manager 202 receives the client data 224a and 224b from the client systems 222a and 222b. The client request manager 202 determines whether relevant information is present on the vulnerability database 204. For example, the client data 224b from the client system 222b may pertain to the open source library 4, which has relevant information in the vulnerability database 202 stored in the open source library data 206d. Thus, the client request manager 202 may send the open source library data 206d to the client system 222b as the client vulnerability data 226b in response to the request made by the client system 222b.

If the vulnerability database 202 does not have relevant information based on the client data 224a, the client request manager 204 invokes the AVIS 212. The client request manager 204 shares the client data 224a with the AVIS controller 214. The AVIS controller 214 initiates a series of operations to identify vulnerabilities using the data scraper 216, the NLP 218, and the vulnerability classifier ensemble 220. Once identified, vulnerability data is returned to the client request manager 202 as the client vulnerability data 226a by the AVIS controller 214. The client request manager 204 can store the client vulnerability data 226a as open source library data on the vulnerability database 204 and returns the client vulnerability data 226a to the client system 222a.

The data scraper 216 takes as input the client data 224a from the AVIS controller 214. The data scraper 216 collects commit messages and bug reports pertaining to open source libraries listed in the client data 224a by scraping data from open source data repositories 232 over the network 230. The data scraper 216 outputs the aggregate information as CBR data to the NLP 218.

The NLP 218 analyzes the CBR data from the data scraper 216 to generate a set of vulnerability vectors. The vulnerability vectors comprise information indicative of vulnerabilities from the CBR data. The generated vulnerability vectors are sent to the vulnerability identifier 220 for processing. The functionality of the NLP 218 and the vulnerability vectors is explored in greater detail by the FIG. 5 description.

The vulnerability classifier ensemble 220 generates a vulnerability probability value for each of the vulnerability vectors. Any identified vulnerabilities are returned to the AVIS controller 214, which returns the identified vulnerabilities as the client vulnerability data 226a to the client request manager 204. The generation of the vulnerability identifier 220 is explored in greater detail by the FIG. 3 description.

The client request manager 202 stores the received client vulnerability data 226a as open source library data or merges it with existing open source library data 206a-d. Any open source library data relevant to the client data 224a is returned to the client system 222a as the client vulnerability data 226a.

In some cases, the vulnerability database 202 and the AVIS 212 may communicate to identify and store vulnerabilities in open source libraries without being prompted by a client system. The vulnerability database 202 may also request the identification of vulnerabilities for open source libraries based on the passing of a predetermined amount of time since the last update to the vulnerabilities of the open source library.

Figure 3:
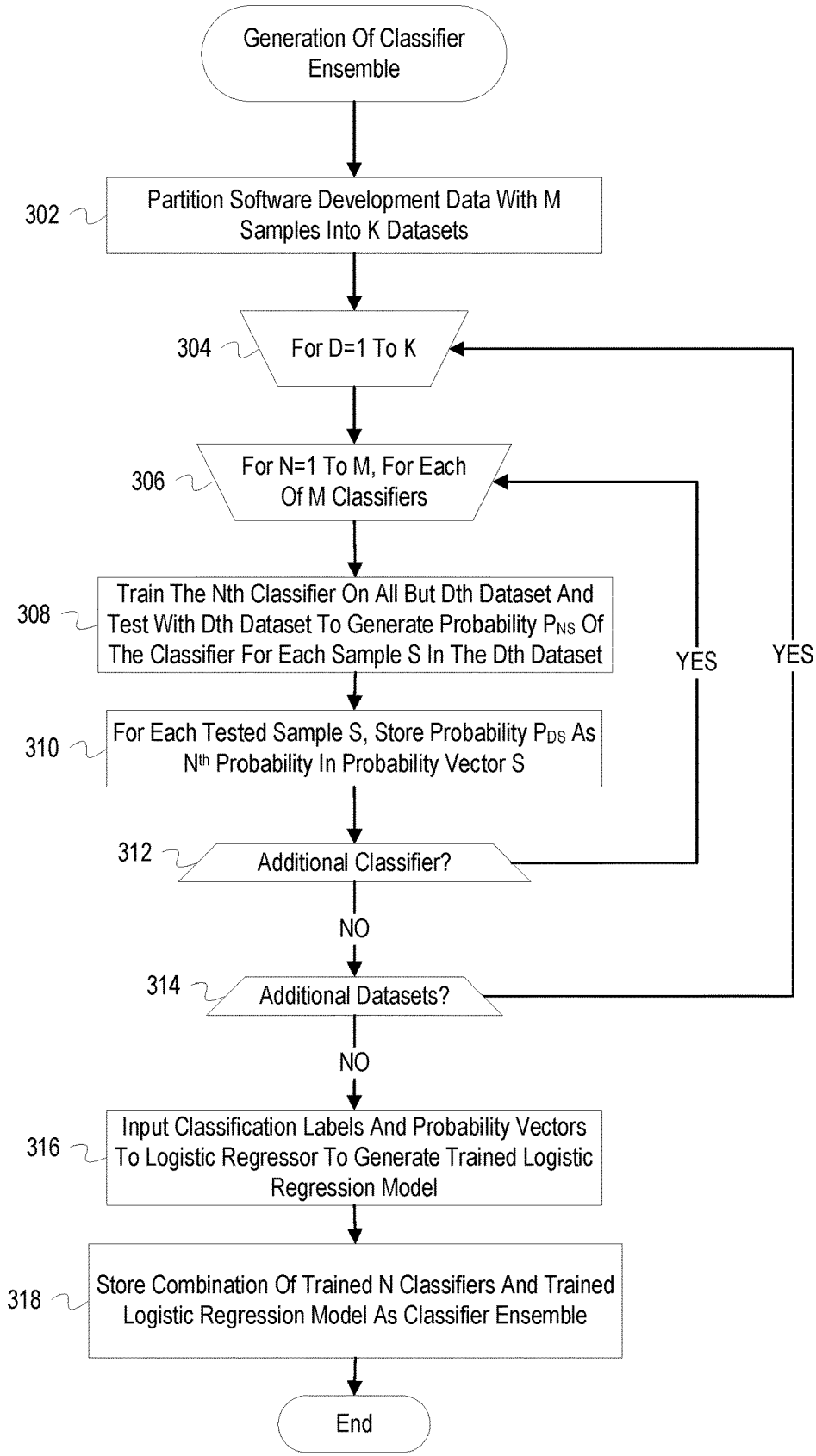
FIG. 3 is a flowchart of example operations for generating a classifier ensemble for flaw identification.

FIG. 3 is a flowchart of example operations for generating a classifier ensemble for flaw identification. The description of FIG. 3 refers to a generator as performing the example operations for consistency with FIG. 1. The generator has access to program code that implements N classifiers. The number and type of classifiers can vary.

At block 302, a generator partitions software development data with M samples into K datasets or folds. The M samples may be M software artifacts or M messages, commits, etc. The folding parameter K may be chosen based on a number of open source components indicated in the software development data. The generator may invoke a defined function/method for K-fold cross validation and pass as parameters the value for K and a reference(s) to the dataset including the M samples. By partitioning the software development data, classifiers can be trained and tested without overfitting.

At block 304, the generator begins an operative loop from 1 to K (or 0 to K−1) according to the splitting/folding algorithm being used. The loop comprises the operations of blocks 306, 308, 310, and 312.

At block 306, the generator begins a nested loop N=1 to M, for the M classifiers. The loop comprises the operations of blocks 308 and 310. The classifier of a current iteration is referred to as the $N^{th}$ classifier.

At block 308, the generator trains the $N^{th}$ classifier on all but the $D^{th}$ dataset and tests the $N^{th}$ classifier with the $D^{th}$ fold. This allows the $N^{th}$ classifier to be trained with a large dataset while reserving the $D^{th}$ fold for testing. The generator uses indices provided from invocation of the K-fold function on the dataset as parameters into a function defined for training each classifier. For instance, a classification label of "1" may indicate that a data sample has a flaw based on expert knowledge or "ground truth." The generator can be programmed to interpret a probability above 0.5 as classification related to a flaw and a probability of 0.5 and below as not related to a flaw. The generator can convert the probability to a binary classification value unless the classifier being trained generates a binary classification value. In addition, a classifier being trained may have a designated output for a first classification and a designated output for a second classification. The output node of the classifier with the greater probability would be selected by the generator. After a training iteration that involves training a classifier with samples in the training folds produces a trained classifier, the generator uses the index or indices into the test fold for the Dth iteration to input samples of the Dth fold into the trained model. For example, training the K-nearest neighbors classifier comprises training the classifier on each data sample (e.g., vector corresponding to a software artifact) in all folds other than the $D^{th}$ fold. This training of the Nth classifier generates or results in a trained K-nearest neighbors classifier. The trained K-nearest neighbors classifier is then tested with the Dth fold by inputting the samples from the Dth fold. For each data sample S in the testing fold, the generator stores the prediction. Thus, the generator stores a probability $P_{NS}$ made by the $N^{th}$ classifier for the sample S in the $D^{th}$ fold as the $N^{th}$ component of a set or vector of predictions for sample S.

At block 310, the generator stores the predictions of the $N^{th}$ trained classifier for samples in the $D^{th}$ dataset fold as the $N^{th}$ component of the $S^{th}$ probability vector. This iterative training and testing of each classifier for each dataset fold yields S×M predictions which are stored as probability vectors. The stored probabilities can be associated with the corresponding classification labels for the samples within the probability vectors or a separate data structure. Embodiments can associate the classification labels with the probabilities different. For example, these can be associated by sample identifiers or the structures can be ordered consistently to allow for a same index to be used across structures for a same data sample. The probability vectors contain the predictions of the N classifiers for the S samples and are used for training a logistic regression model.

At block 312, the generator determines whether there is an additional classifier to train and test. For example, the generator determines whether the loop control variable N is equal to M. If there is an additional classifier to train and test, the flow of operations returns to block 306. If there is not an additional classifier, the flow of operations continues to block 314.

At block 314, the generator determines whether there is an additional dataset fold or partition. For example, the generator determines whether the loop control variable is equal to K. If there is an additional fold, the flow of operations returns to block 304. Otherwise, the flow of operations continues to block 316.

At block 316, the generator feeds classified vulnerability data (classification labels) and the probability vectors to a logistic regressor. The logistic regressor trains a logistic regression model with the classification labels and probability vectors. The logistic regressor trains a model based on a logistic probability distribution given by:

$$p(x)=(1+e^{-(\beta_0+\overline{\beta_1}\cdot\vec{x})})^{-1},$$

where p(x) is the probability of a prediction being accurate, x is a probability vector, and $\beta_0$ and $\beta_1$ are parameters that best fit a logistic probability curve to the probability vectors.

The parameters $\beta_0$ and $\beta_1$ are determined by fitting the above equation to the classified vulnerability data as a function of the probability vectors. Once determined, the parameters $\beta_0$ and $\beta_1$ specify the logistic probability distribution or the trained logistic regression model. To train the logistic regression model, the regressor linearly combines the probabilities of each probability vector and accepts as input features the linearly combined probabilities and the corresponding classification labels. The regressor can use stochastic gradient descent to estimate the values of the model parameters or coefficients $\beta_0$ and $\beta_1$. Training continues until a specified accuracy threshold is satisfied.

A predetermined probability threshold can be used to turn the logistic regression model into a binary classifier. For example, if a probability threshold of p=0.5 is used, vulnerability vectors which give a probability p(x)≥0.5 will return a 1 (indicating a vulnerability) and vulnerability vectors which give a probability p(x)<0.5 will return a 0 (indicating no vulnerability). The selection of a probability threshold is discussed in greater detail by the FIG. 6 description.

At block 318, the generator stores as a classifier ensemble a combination of the M trained classifiers and the trained logistic regression model that satisfies the accuracy threshold, which may be based on specified precision and recall rates. To create the classifier ensemble, the generator constructs program code that passes an input vector for a software artifact or software component to each of the M trained classifiers, stores the outputs of the M trained classifiers as a set or vector, and passes that set or vector of M trained classifier outputs to the trained logistic regression model. The output of the trained logistic regression model can be a binary classification that is then associated with the software component represented by the input vector, or can be a probability value that is associated with the software component.

The above training refers to an initial training and testing to form a classifier ensemble. This initial training would likely have a large-scale training data set that encompasses a large time period (e.g., years or months). After training and deployment, the classifier ensemble continues to be trained with smaller training datasets, depending upon use. In contrast to the initial training, the output of subsequent training is used (e.g., stored for expert evaluation and/or inserted into a vulnerability database). The subsequent "training" datasets may be obtained from scheduled, periodic running of the data scraper or specific invocation of the data scraper to collect CBR data from a particular data source or set of data sources. Furthermore, classifier ensembles can be trained for different data sources. For example, a classifier ensemble can be trained for each flaw (bug or vulnerability) tracking tool or repository. Classifier ensembles can be trained for different open source repositories.

Figure 4:
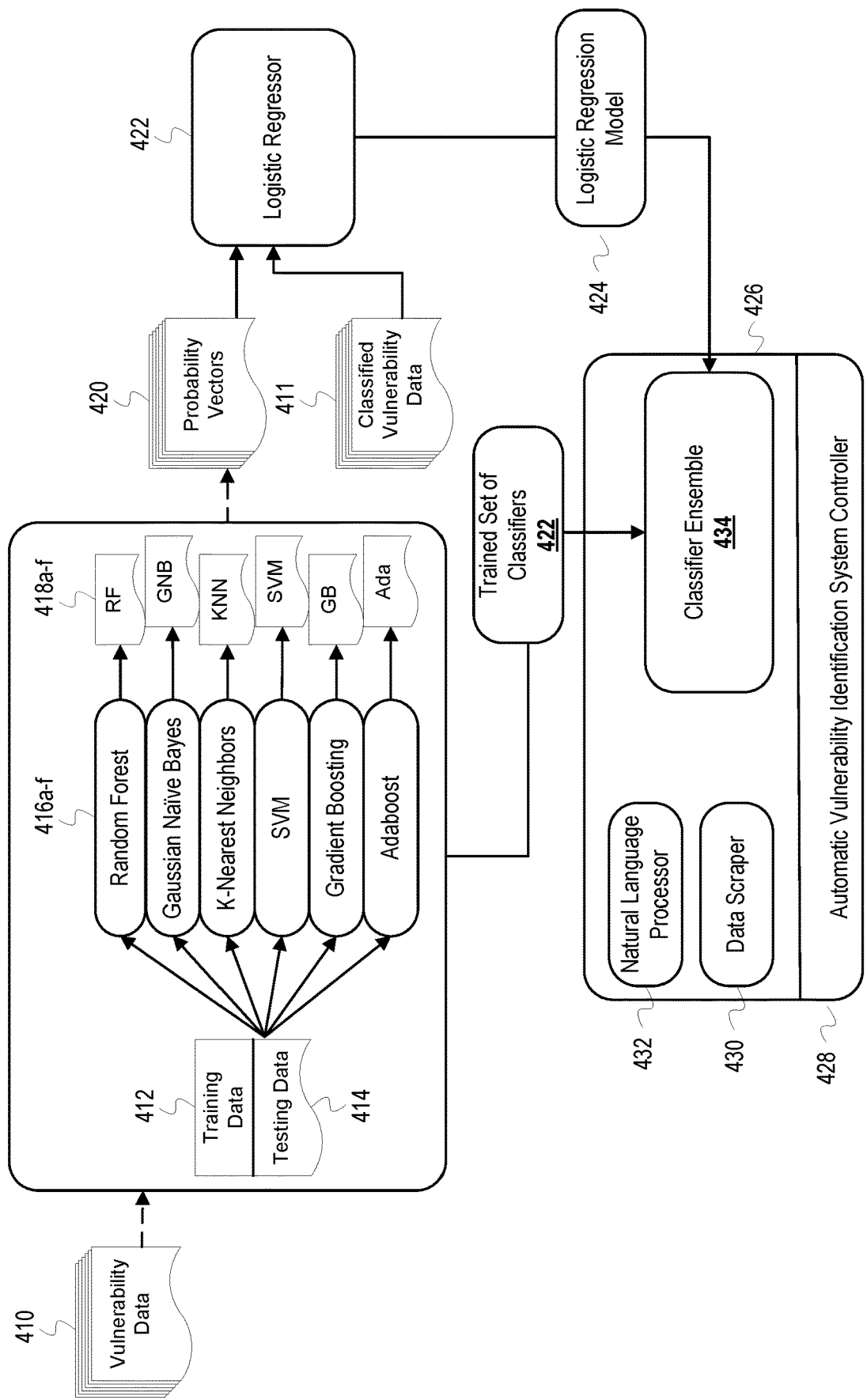
FIG. 4 depicts an example automatic vulnerability identification system.

FIG. 4 depicts an example automatic vulnerability identification system. Vulnerability data 410 and classified vulnerability data 411 are both partitioned into K datasets which are fed to a K-stacking algorithm to generate K sets of training data 412 and testing data 414, respectively. The training data 412 is used to train a set of classifiers 416a-f. The training data 412 and the testing data 414 are fed to the classifiers 416a-f to generate classifier data 418a-f. The K sets of the classifier data 418a-f are combined as probability vectors folded together to form K-fold classifier data 420 and classified vulnerability data 411 are fed to a logistic regressor 422 which outputs a trained logistic regression model 424. An AVIS 426 with an AVIS controller 428, a data scraper 430, and a natural language processor 432 combines the logistic regression model 424 and a set of trained classifiers 422 to form the classifier ensemble 434.

Each of the classifiers 416a-f are iteratively trained K times with different folds. Specifically, the classifiers 416a-f are iteratively trained with all but the holdout fold or partition of the vulnerability data 410 and the classified vulnerability data 411. The trained classifiers 416a-f generate a set of classifier data 418a-f for the holdout partition of the vulnerability data 410 in each iteration.

As the classifiers 416a-f are trained and tested, each of the K sets of classifier data 418a-f are combined as the probability vectors 420. Once K iterations of the training and testing have been run, the probability vectors 420 and the classified vulnerability data 411 are fed to the logistic regressor 422, where the probability vectors 420 and the classified vulnerability data 411 are used to generate the logistic regression model 424.

The logistic regressor 422 determines a logistic probability distribution based on the vulnerability vectors 420 and the classified vulnerability data 411. The logistic regressor 422 fits a logistic probability distribution to the classified vulnerability data 411 as a function of the probability vectors 420. The fitting process comprises determining N+1 parameters (where N is the number of classifiers) which most closely fit a logistic probability distribution to the vulnerability data 411.

The trained classifiers 422 and the output of the logistic regressor 422 are sent to form the ensemble of classifiers 434 by an AVIS 426. The AVIS controller 428, invokes the different elements of the AVIS 426 to automatically identify flaws in input software artifacts. If a software artifact is input, then the NLP 432 will process the software artifact and generate a software artifact vector. The AVIS controller 428 then passes the software artifact vector to classifier ensemble 434, which generates a probability value indicating a probability that the corresponding software component has a flaw. If an open source repository or other target is submitted to the AVIS 426, then the data scraper 430 is invoked to scrape the identified target and pass the scraped software artifacts to the NLP 432.

Figure 5:
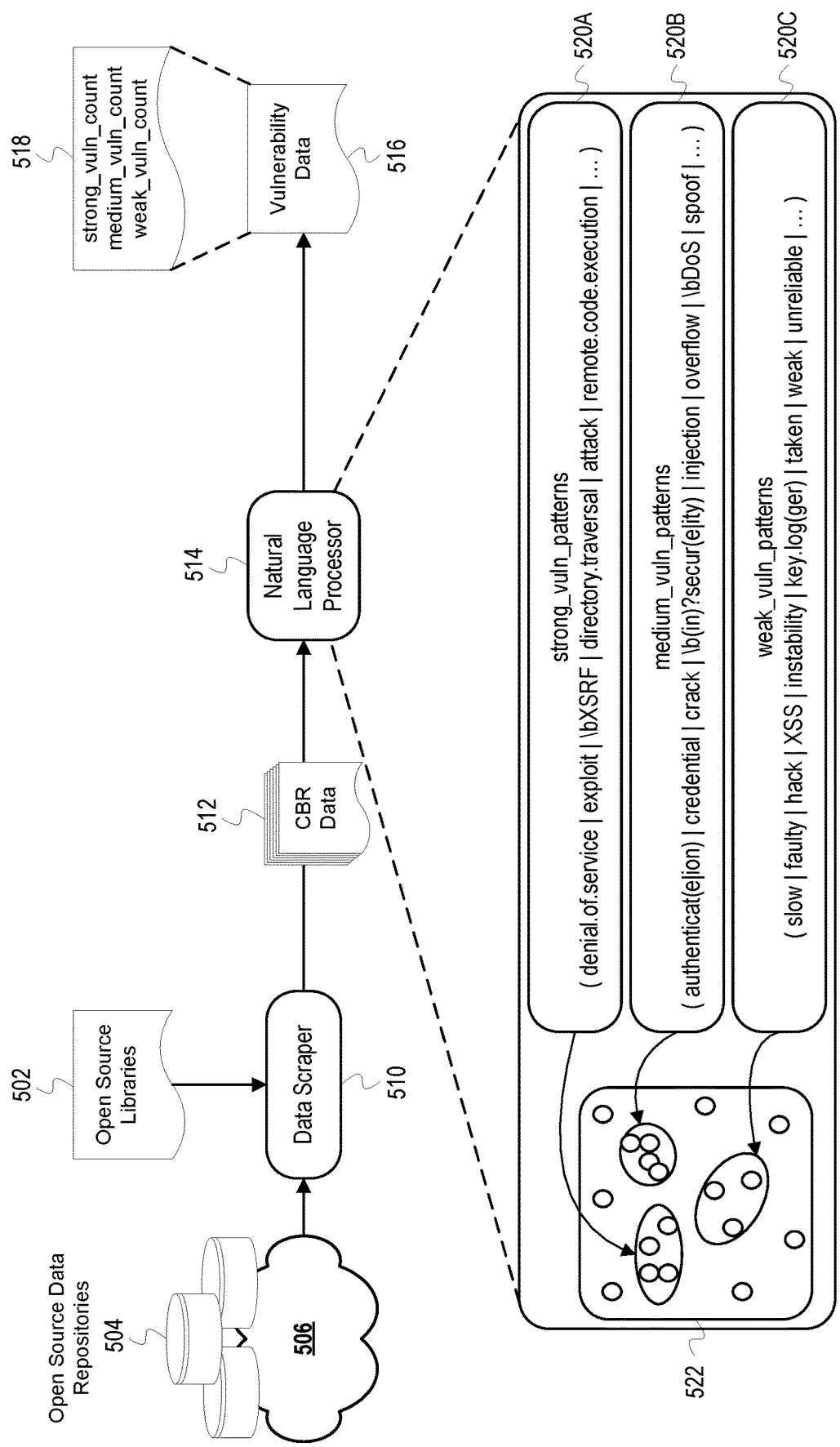
FIG. 5 depicts the use of a natural language processor for generating vulnerability vectors.

FIG. 5 depicts the use of a natural language processor for generating vulnerability vectors. Based on a list of open source libraries 502, a number of open source data repositories 504 are scraped over a network 506 by a data scraper 510 to collect CBR data 512. The CBR data 512 is sent by the data scraper 510 to an NLP 514. The NLP 514 generates vulnerability data 516, which comprises a set of vulnerability vectors 518. The NLP 514 outputs counts of words or phrases in vulnerability detection vectors 520A-C based on an embedding of the CBR data 512 in a vector space 522.

The NLP 514 performs operations to classify words and phrases from the CBR data 512 according to their indication of vulnerabilities to generate the vulnerability data 516. The vulnerability data 516 comprises a set of vulnerability vectors 518, which are frequency counts of words or phrases indicative of vulnerabilities as classified by the NLP 514. The association of words and phrases with vulnerabilities is determined by the vulnerability detection vectors 520A-C. The vulnerability detection vectors 520A-C may be manually determined based on words or phrases known to indicate vulnerabilities in open source libraries. The size of each of the vulnerability detection vectors 520A-C may range from several terms to hundreds of terms; for example, a typical vulnerability detection vector may comprise 200 words or phrases (tokens). A corresponding vector space 522 is constructed with dimension equal to the sum of dimensions of the vulnerability detection vectors 520A-C.

The NLP 514 embeds the CBR data 512 into the vector space 522 based on the distribution of words or phrases in the CBR data 512. By embedding the CBR data 512 into the vector space 522, each of the words or phrases in the CBR data 512 can be compared to words or phrases in the vulnerability detection vectors 520A-C based on their cosine similarity. The cosine similarity of two vectors is given by:

$$\text{similarity} = \cos\theta = \frac{A \cdot B}{\|A\| \|B\|}$$

Wherein A and B are vectors and $\theta$ is the angle between them. A similarity of 1 indicates identical parallel vectors while a similarity of 0 indicates orthogonal vectors. Each of the components of the vulnerability detection vectors are mutually orthogonal vectors in the vector space 522. New words or phrases can be embedded in the vector space 522 based on their association with words already in the vector space 522.

As the CBR data 512 is classified by the NLP 514, words and phrases are embedded in the vector space 522 based on their proximity to words in the vector space 522. For example, a new word in the CBR data 512 can be embedded in the vector space by taking the sum of each vector corresponding to a word or phrase in the vulnerability detection vectors 520A-C and dividing by the distance of the two words. For example, if some CBR data 512 comprises the phrase "The exploit renders my computer unresponsive due to injection of faulty data". Embedding the word "unresponsive" is possible by using the words "exploit" (which is 4 words away), "injection" (which is 3 words away) and "faulty" (which is 5 words away) to generate a vector for "unresponsive in the vector space. By adding each weighted word association to a vector with dimension equal to the sum of the dimensions of the vulnerability detection vectors 520A-C, the vector for the word "unresponsive" may be represented by:

(0, 1/4, 0, . . . , 0, 1/3, 0, . . . , 0, 1/5, 0, . . . )

Wherein the entry 1/4 corresponds to "exploit", the entry 1/3 corresponds to "injection", and the entry 1/5 corresponds to "faulty". In this way, every word or phrase in the CBR data 512 can be embedded into the vector space 522. In some cases, words in the CBR data 512 may be associated with one another as part of the embedding process. In some cases, the embedding may use a different weighting scheme to associate words and phrases. In some cases, there may exist a threshold to remove associations between words which are distant. For example, the association of two words with more than 50 words between them may be ignored. Such thresholds are illustrated by the ellipses about words or phrases in the vulnerability detection vectors 520A-C in the vector space 522. Any words outside of the three ellipses would be ignored when generating the vulnerability data 516.

Based on the embedding of the CBR data 512 in the vector space 522, the NLP 514 generates the vulnerability data 516 by summing the vectors of each word or phrase in the CBR data 512 to generate the vulnerability vectors 518, which comprise the vectors strong_vuln_count, medium_vuln_count, and weak_vuln_count. These vectors are generated by summing the associations of each word in the CBR data 512 with each word in the vulnerability detection vectors 520A, 520B, and 520C, respectively.

A feature of the NLP 514 is that, because it processes a combination of natural language and generic computer science terms, it is "language agnostic" in the sense that the programming languages of open source libraries do not affect the ability of the NLP 514 to generate the vulnerability data 516 for vulnerability identification.

Figure 6:
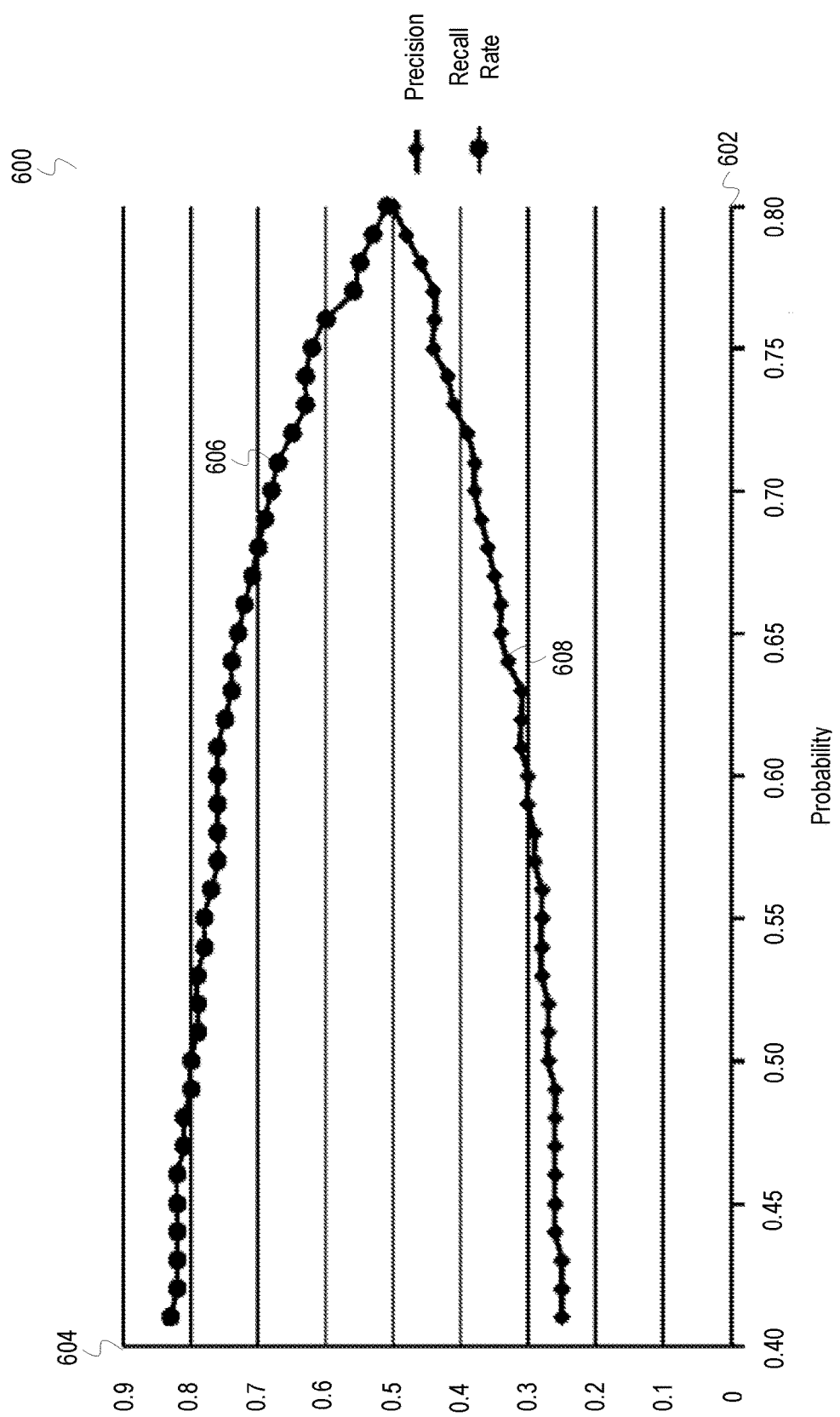
FIG. 6 is a graph depicting metrics for an automatic vulnerability identification system.

FIG. 6 is a graph depicting metrics for an automatic vulnerability identification system. The graph 600 has an x-axis 602 measuring the probability threshold for predictions made by an AVIS and a y-axis 604 depicting multiple metrics for the AVIS. A line 606 depicts the recall rate of predictions made by the AVIS and a line 608 depicts the precision of predictions made by the AVIS. The two lines 606, 608 are dependent upon the probability threshold of the AVIS (i.e., the probability threshold for accepting or rejecting predictions made by the AVIS as introduced by FIG. 3). For various applications, it may be beneficial to increase or decrease the probability threshold of the AVIS to ensure a greater recall rate with lower precision or a greater precision with lower recall rate.

The values shown in the graph 600 are taken from a trained AVIS. The high values of precision and recall rate are indicative of an improvement in the technology of automatic vulnerability identification for open source libraries. Predictions made by an AVIS can be sorted into one of four categories when classified vulnerability data is available. The four categories are true positives, false positives, true negatives, and false negatives. True positives correspond to the AVIS correctly detecting a vulnerability. False positives correspond to the AVIS incorrectly detecting a vulnerability. True negatives correspond to the AVIS correctly detecting no vulnerabilities. False negatives correspond to the AVIS incorrectly detecting no vulnerabilities. The precision of predictions made by the AVIS is a measure of how many vulnerabilities were correctly detected based on the number of true positives and false positives predicted by the AVIS and is given by:

$$\text{Precision} = \frac{\text{true positives}}{\text{true positives} + \text{false positives}}$$

At equilibrium (where precision and recall rate converge), a precision of over 50% is given by the disclosed method by using a probability threshold of 80%. The recall rate of predictions made by the AVIS is a measure of how many vulnerabilities were detected based on the number of true positives and false negatives predicted by the AVIS and is given by:

$$\text{Recall rate} = \frac{\text{true positives}}{\text{true positives} + \text{false negatives}}$$

At equilibrium, a recall rate of over 50% is given by the disclosed method by using a probability threshold of 80%. With a lower probability threshold, a recall rate of over 80% can be achieved.

In some cases, clients may request the AVIS to use a custom probability threshold in accordance with client needs as an operational parameter in client requests. For example, a project which requires a high level of stability may specify a low probability threshold for the classifier ensemble (e.g., a probability value <=0.3 is classified as not related to a flaw) to maximize the recall rate. This would guarantee the client the detection of a greater number of vulnerabilities (at the cost of a larger number of false positives as well). For clients which do not require as much stability in their projects, a higher probability threshold may be used to expedite the development process by identifying potential vulnerabilities with high precision.

By adjusting the probability threshold of the AVIS, the balance of precision to recall rate may be adjusted. As the probability threshold of the AVIS decreases the recall rate decreases while the precision rate increases. As a default, the AVIS may use a probability threshold that produces equal values for precision and recall rate.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 304-314 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
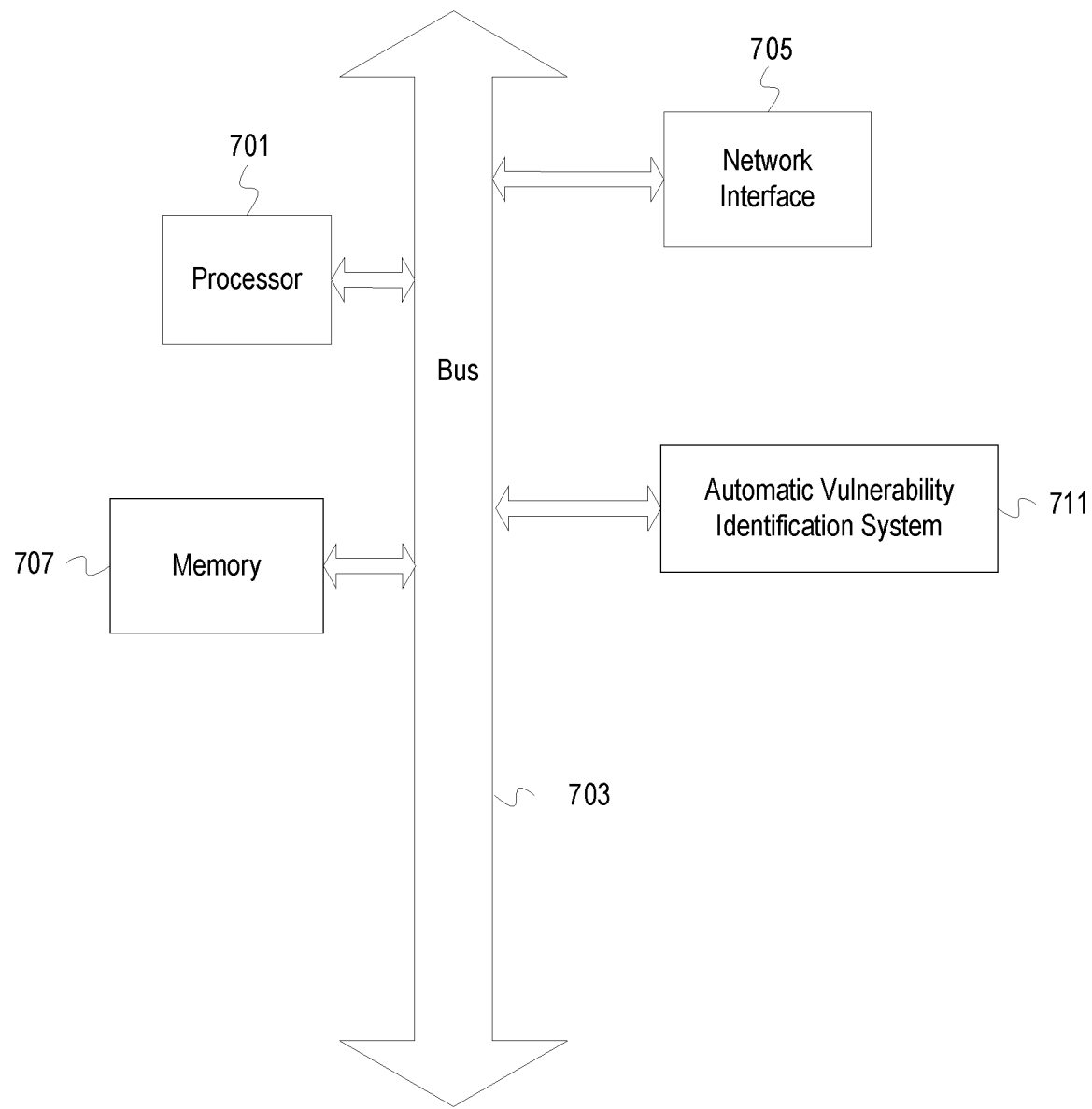
FIG. 7 depicts an example computer system with an automatic vulnerability identification system.

FIG. 7 depicts an example computer system with an automatic vulnerability identification system. The computer system includes a processor 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). The system also includes automatic vulnerability identification system 711. The automatic vulnerability identification system 711 identifies vulnerabilities in open source components (e.g., libraries or projects) based on commit messages and bug reports. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for automatic vulnerability identification as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   invoking k-fold cross validation to train and test a set of classifiers and program code to train a logistic regression model with probability vectors from the set of classifiers generated from the k-fold cross validation;
   inputting a software development artifact derived vector to an ensemble of the trained set of classifiers and the trained logistic regression model,
      wherein the trained set of classifiers generates a set of probabilities that a software component identified by the software development artifact from which the vector is derived has a vulnerability or flaw,
      wherein the ensemble generates a probability that the software component has a vulnerability or flaw based on fitting a linear combination of the set of probabilities to the trained logistic regression model; and
   updating a database with the probability generated from the ensemble in association with identity of the software component.

2. The method of claim 1, wherein updating the database with the probability in association with the software component identity comprises updating the database with the probability and at least one of the software development artifact and the software development artifact derived vector.

3. The method of claim 1, further comprising deriving the vector from the software development artifact.

4. The method of claim 3, wherein deriving the vector comprises extracting tokens from the software development artifact with a natural language processor that has been trained to extract natural language tokens related to vulnerabilities or flaws and programming language specific tokens related to vulnerabilities or flaws.

5. The method of claim 1, wherein the software development artifact comprises at least one of a commit message and a bug report.

6. The method of claim 1, further comprising associating a label with the software component, wherein the label indicates whether the software component has a vulnerability or flaw based, at least in part, on the probability generated from the ensemble in association with the identity of the software component.

7. A non-transitory, computer-readable medium having program code stored thereon that is executable by a computing device, the program code comprising instructions to:
invoke k-fold cross validation to train and test a set of classifiers and program code to train a logistic regression model with probability vectors from the set of classifiers generated from the k-fold cross validation;
input a software development artifact derived vector to an ensemble of the trained set of classifiers and the trained logistic regression model,
wherein the trained set of classifiers generates a set of probabilities that a software component identified by the software development artifact from which the vector is derived has a vulnerability or flaw,
wherein the ensemble generates a probability that the software component has a vulnerability or flaw based on fitting a linear combination of the set of probabilities to the trained logistic regression model; and
update a database with the probability generated from the ensemble in association with identity of the software component.

8. The computer-readable medium of claim 7, wherein the instructions to update the database with the probability in association with the software component identity comprise instructions to update the database with the probability and at least one of the software development artifact and the software development artifact derived vector.

9. The computer-readable medium of claim 7, further comprising instructions to derive the vector from the software development artifact.

10. The computer-readable medium of claim 9, wherein the instructions to derive the vector comprise instructions to extract tokens from the software development artifact with a natural language processor that has been trained to extract natural language tokens related to vulnerabilities or flaws and programming language specific tokens related to vulnerabilities or flaws.

11. The computer-readable medium of claim 7, wherein the software development artifact comprises at least one of a commit message and a bug report.

12. The computer-readable medium of claim 7, further comprising instructions to associate a label with the software component, wherein the label indicates whether the software component has a vulnerability or flaw based, at least in part, on the probability generated from the ensemble in association with the identity of the software component.

13. An apparatus comprising:
a processor; and
a non-transitory computer-readable medium having instructions stored thereon that are executable by the processor to cause the apparatus to,
train and test a set of classifiers with k-fold cross validation on a first dataset comprising labels and vectors representing software components,
wherein each label indicates whether a respective one of the software components has a vulnerability or flaw,
wherein a set of probability values generated for each of the vectors by the set of classifiers from the testing is stored;
train a logistic regression model with the stored sets of probability values and the labels; and
combine the trained set of classifiers and the trained logistic regression model to generate an ensemble that indicates whether a software component has a flaw.

14. The apparatus of claim 13, further comprising instructions executable by the processor to cause the apparatus to, for each of the software components, extract tokens from a software development artifact to generate the vector of the vectors that represents the software component.

15. The apparatus of claim 13, wherein the instructions executable by the processor to cause the apparatus to extract tokens comprise instructions to extract natural language tokens and programming specific tokens.

16. The apparatus of claim 13 further comprising instructions executable by the processor to cause the apparatus to associate the labels with the vectors based on knowledge of whether the represented software components have vulnerabilities or flaws.

17. The apparatus of claim 13 further comprising instructions executable by the processor to cause the apparatus to collect data about open source software components, wherein the first dataset is based on the collected data.

18. The apparatus of claim 17, wherein the instructions executable by the processor to cause the apparatus to collect the data comprise instructions to collect data from commit and bug report repositories.

19. The apparatus of claim 13, wherein the instructions executable by the processor to cause the apparatus to combine to generate the ensemble comprise instructions to combine the trained set of classifiers with the trained logistic regression model for the trained set of classifiers to output probabilities for a vector representing a software component and the trained logistic regression model to output a vulnerability probability or vulnerability indicator based on fitting a linear combination of the output probabilities to the trained logistic regression model.

20. The apparatus of claim 13, further comprising instructions executable by the processor to cause the apparatus to:
based on a vector input to the ensemble, generate from the trained set of classifiers a first set of probabilities that the software component represented by the vector has a vulnerability and fit a linear combination of the first set of probabilities to the trained logistic regression model; and
generate a probability that the vector has a vulnerability based on the fitting.

* * * * *